(12) United States Patent
Rivera et al.

(10) Patent No.: US 10,874,121 B2
(45) Date of Patent: *Dec. 29, 2020

(54) NATURALLY SWEETENED JUICE BEVERAGE PRODUCTS

(71) Applicant: Tropicana Products, Inc., Bradenton, FL (US)

(72) Inventors: Teodoro Rivera, Algonquin, IL (US); Jessica Oesterling, Chicago, IL (US)

(73) Assignee: Tropicana Products, Inc., Bradenton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/699,659

(22) Filed: Sep. 8, 2017

(65) Prior Publication Data

US 2017/0367374 A1    Dec. 28, 2017

Related U.S. Application Data

(63) Continuation of application No. 12/510,628, filed on Jul. 28, 2009, now Pat. No. 9,788,562.

(60) Provisional application No. 61/092,782, filed on Aug. 29, 2008.

(51) Int. Cl.
  *A23L 2/02*    (2006.01)
  *A23L 2/60*    (2006.01)

(52) U.S. Cl.
  CPC .. *A23L 2/02* (2013.01); *A23L 2/60* (2013.01)

(58) Field of Classification Search
  CPC ..................................... A23L 2/02; A23L 2/60
  USPC ........................................................... 426/599
  See application file for complete search history.

(56) References Cited

U.S. PATENT DOCUMENTS

| | | | | |
|---|---|---|---|---|
| 4,690,827 A | * | 9/1987 | Kupper ..................... | A23L 2/60 426/548 |
| 5,108,774 A | * | 4/1992 | Mills ........................ | A23L 2/52 426/590 |
| 2007/0116837 A1 | * | 5/2007 | Prakash .................... | A23L 2/60 426/548 |

* cited by examiner

*Primary Examiner* — Jeffrey P Mornhinweg
(74) *Attorney, Agent, or Firm* — Barnes & Thornburg LLP; G. Peter Nichols

(57) ABSTRACT

Naturally sweetened reduced calorie, light, or low-calorie beverage products and methods for making the same are disclosed. The beverage products comprise at least one fruit juice, at least one natural non-nutritive sweetener, and homogenized pulp.

17 Claims, No Drawings

NATURALLY SWEETENED JUICE BEVERAGE PRODUCTS

PRIORITY CLAIM

This application claims priority to U.S. Provisional Application Ser. No. 61/092,782, filed Aug. 29, 2008 and entitled, Naturally Sweetened Juice Beverage Products, the entire disclosure of which is hereby incorporated by reference.

TECHNICAL FIELD

The present invention relates to beverages and other beverage products, such as beverage concentrates, etc. In particular, this invention relates to beverages having formulations suitable to meet market demand for reduced-calorie, light, or low-calorie juice beverages.

BACKGROUND

High caloric intake has been associated with various concerns, such as weight gain, leading to health problems such as diabetes and cardiovascular disease. As consumers become more health and weight conscious, the calorie contents of foods are increasingly becoming a significant consideration. Food manufacturers have marketed wellness foods with low-calorie ingredients to attract health and weight conscious consumers. A significant market now exists for reduced calorie, light, or low-calorie foods.

However, reduced calorie, light, or low-calorie foods tend to lack flavor due to low sugar content or low perceived sweetness. Manufacturers have tried to counter this problem by adding high amounts of artificial sugar substitutes and flavorings to make the food taste more like full-calorie products. For example, artificial high-intensity sweeteners, e.g., sucralose, aspartame, saccharin and acesulfame-K among others, have been used to deliver sweetness in reduced calorie, light, or low-calorie beverages. However, certain artificial ingredients are believed to cause serious health problems and hence are not well-received by consumers. Consumers are especially concerned in the case of children consuming food products having artificial sweeteners. Consumers have become increasingly wary of artificial ingredients and are looking for natural ingredients, that is, ingredients distilled, extracted, concentrated or similarly obtained from harvested plants and other naturally occurring sources, with limited or no further processing.

Furthermore, use of artificial sweeteners produces an off-taste or lingering bitter aftertaste, resulting in beverages which have a different quality of sweetness than full-calorie beverages. In addition, mouthfeel of reduced calorie, light, or low-calorie beverages is typically "thin" or "watery" due to removal or lack of addition of sugars and/or other solids. So there is perceived market demand for beverages having good flavor profiles, including good taste, mouthfeel, flavor impact, etc.

It is therefore the object of the present invention to provide naturally sweetened reduced calorie, light, or low-calorie beverages without the negative characteristics of conventional reduced calorie, light, or low-calorie beverages. It is an object of at least certain embodiments of the present invention to provide reduced calorie, light, or low-calorie juice beverages having natural non-nutritive sweeteners. These and other objects, features and advantages of the invention or of certain embodiments of the invention will be apparent to those skilled in the art from the following disclosure and description of exemplary embodiments.

SUMMARY

In accordance with a first aspect of the invention, a beverage product is provided which comprises at least one fruit juice, at least one natural non-nutritive sweetener, and homogenized pulp. In certain exemplary embodiments, the fruit juice may be, but is not limited to: orange juice, grapefruit juice, lemon juice, lime juice, or a mixture thereof. In certain exemplary embodiments, the natural non-nutritive sweetener may be at least one of rebaudioside A, steviol glycosides, *Stevia rebaudiana* extracts, Lo Han Guo, mogroside V, monatin, glycyrrhizin, thaumatin, monellin, or brazzein. In certain exemplary embodiments, the beverage product comprises orange juice, added water, rebaudioside A, citric and malic acids, homogenized orange pulp, a citrus flavor, and at least one additional taste modifier. The beverage product of invention provides the consumer with a more palatable, natural sweet flavor and mouthfeel than the typical reduced calorie, light, or low-calorie juice beverage sweetened with artificial sweeteners, that is, the beverage product of invention tastes more like a 100% juice beverage.

In accordance with another aspect, a method for preparing a beverage product is provided which comprises mixing together a number of ingredients, all or some of which are optionally pre-combined in any order. The ingredients include at least one fruit juice, at least one natural non-nutritive sweetener, and homogenized pulp. In certain exemplary embodiments, the ingredients additionally include one or more of any of the beverage ingredients disclosed herein.

It will be appreciated by those skilled in the art, given the benefit of the following description of certain exemplary embodiments of the beverage products disclosed here, that at least certain embodiments of the invention have improved or alternative formulations suitable to provide desirable taste profiles, nutritional characteristics, etc. These and other aspects, features and advantages of the invention or of certain embodiments of the invention will be further understood by those skilled in the art from the following description of exemplary embodiments.

DETAILED DESCRIPTION

The present invention relates generally to beverage products having reduced calorie content. Calorie reduction is achieved with no or less reliance on artificial sweeteners than conventional reduced calorie, light, or low-calorie beverages. In one embodiment, the reduced calorie, light, or low-calorie beverage comprises not-from-concentrate (NFC) or from-concentrate (FC) juices. Juice can be formed from fruit or vegetable sources. In certain exemplary embodiments, the beverage product comprises citrus juice. In certain exemplary embodiments, the beverage product comprises a not-from-concentrate (NFC) orange juice. Other types of fruit or vegetable juices include but are not limited to juices of citrus fruit (e.g., orange, grapefruit, lemon, lime, tangerine, tangelo), apricot, apple, kumquat, mango, pear, peach, pineapple, papaya, passion fruit, grape, strawberry, raspberry, cranberry, currant, bean, blueberry, blackberry, acai, lychee, kiwi, pomegranate, watermelon, rhubarb, aronia, tomato, celery, cucurbits, onion, watercress, cucumber, carrot, parsley, beet, asparagus, potato, turnip, rutabaga, and a combination of any of them. In certain exemplary embodiments, the beverage product comprises juice (e.g., citrus juice, orange juice) in an amount from about 5% to about 90% by weight of the beverage product, e.g., about 10% to about 75% by weight, about 15% to about 50% by weight, or about 20% to about 30% by weight.

In certain exemplary embodiments, the beverage may include a vegetable component, including, e.g., but not limited to: one or more vegetable juices, extracts, powders, skins, rinds, grinds, roots, pulps, homogenized pulps, purees, or any combination thereof. The vegetable component can be used in the beverage in any suitable amount or concentration effective to achieve the level of taste desired. When included in the mixture, the ratio of fruit juice to vegetable juice may vary, depending on the manner in which the vegetable and fruit juices are mixed and/or the beverage product to be produced. The ratio of fruit to vegetable juice will vary to suit a particular application and can include, for example, 0:100, 100:0, 2:1, 3:1, or 3:2. In certain exemplary embodiments, the mixture of fruit juice and vegetable juice comprises about 80-60% fruit juice and about 20-40% vegetable juice. In a particular application the fruit to vegetable juice ratio is about 80:20; however, other ratios are contemplated and within the scope of the invention.

The beverage products disclosed here include beverages, i.e., ready to drink liquid formulations, beverage concentrates and the like. At least certain exemplary embodiments of the beverage concentrates contemplated are prepared with an initial volume of juice or juice concentrate to which the additional ingredients are added. Full strength beverage compositions can be formed from the beverage concentrate by adding further volumes of water to the concentrate. In certain other embodiments, a full strength beverage is directly prepared without the formation of a concentrate and subsequent dilution.

In certain exemplary embodiments, the beverage product comprises juice with added water. Purified or filtered water can be used in the manufacture of certain embodiments of the beverages disclosed here, and water of a standard beverage quality can be employed in order not to adversely affect beverage taste, odor, or appearance. The water typically will be clear, colorless, free from objectionable minerals, tastes and odors, free from organic matter, low in alkalinity and of acceptable microbiological quality based on industry and government standards applicable at the time of producing the beverage. In certain exemplary embodiments, water is added at a level of from about 0% to about 90% by weight of the beverage product, e.g., about 15% to about 80% by weight, about 40% to about 70% by weight, or about 50% to about 60% by weight.

Various sweeteners may be included in the formulations of the beverage products disclosed herein. The sweeteners are edible consumables suitable for consumption and for use in beverages. By "edible consumables" is meant a food or beverage or an ingredient of a food or beverage for human or animal consumption. The sweetener or sweetening agent used herein is preferably a non-nutritive and natural beverage ingredient or additive (or mixtures of them) which provides sweetness to the beverage, i.e., which is perceived as sweet by the sense of taste. The perception of flavoring agents and sweetening agents may depend to some extent on the interrelation of elements. Flavor and sweetness may also be perceived separately, i.e., flavor and sweetness perception may be both dependent upon each other and independent of each other. For example, when a large amount of a flavoring agent is used, a small amount of a sweetening agent may be readily perceptible and vice versa. Thus, the oral and olfactory interaction between a flavoring agent and a sweetening agent may involve the interrelationship of elements.

As used herein, "taste" refers to a combination of sweetness perception, temporal effects of sweetness perception, i.e., on-set and duration, off-tastes, e.g. bitterness and metallic taste, residual perception (aftertaste) and tactile perception, e.g. body and thickness. As used herein, a "potent sweetener" means a sweetener which is at least twice as sweet as sugar, that is, a sweetener which on a weight basis requires no more than half the weight of sugar to achieve an equivalent sweetness. For example, a potent sweetener may require less than one-half the weight of sugar to achieve an equivalent sweetness in a beverage sweetened to a level of 10 degrees Brix with sugar. Potent sweeteners include both nutritive and non-nutritive sweeteners. In addition, potent sweeteners include both natural potent sweeteners and artificial potent sweeteners. However, for certain exemplary embodiments of the naturally sweetened beverage products disclosed here, only natural potent sweeteners are employed. Commonly accepted potency figures for certain potent sweeteners include, for example,

| | |
|---|---|
| Cyclamate | 30 times as sweet as sugar |
| Stevioside | 100-250 times as sweet as sugar |
| Mogroside V | 100-300 times as sweet as sugar |
| Rebaudioside A | 150-300 times as sweet as sugar |
| Acesulfame-K | 200 times as sweet as sugar |
| Aspartame | 200 times as sweet as sugar |
| Saccharin | 300 times as sweet as sugar |
| Neohesperidin dihydrochalcone | 300 times as sweet as sugar |
| Sucralose | 600 times as sweet as sugar |
| Neotame | 8,000 times as sweet as sugar |

As used herein, a "non-nutritive sweetener" is one which does not provide significant caloric content in typical usage amounts, i.e., is one which imparts less than 5 calories per 8 oz. serving of beverage to achieve the sweetness equivalent of 10 Brix of sugar. As used herein, "reduced calorie beverage" means a beverage having at least a 25% reduction in calories per 8 oz. serving of beverage as compared to the full calorie version, typically a previously commercialized full-calorie version. As used herein, a "light beverage" means a beverage having at least ⅓ less calories per 8 oz. serving of beverage as compared to the full calorie version, typically a previously commercialized full-calorie version. As used herein, a "low-calorie beverage" has fewer than 40 calories per 8 oz. serving of beverage. In certain exemplary embodiments, the beverage product of invention is a light orange juice beverage having about 50 calories per 8 oz. serving.

In certain exemplary embodiments, the beverage products disclosed here are natural in that they do not contain anything artificial or synthetic that would not normally be expected to be in food. In certain exemplary embodiments, the beverage products disclosed here do not contain any artificial sweeteners. In certain exemplary embodiments, the beverage products disclosed here are naturally sweetened with a natural non-nutritive sweetener. As used herein, a "natural" beverage ingredient is defined in accordance with the following guidelines: Raw materials for a natural ingredient exists or originates in nature. Biological synthesis involving fermentation and enzymes can be employed, but synthesis with chemical reagents is not utilized. Artificial colors, preservatives, and flavors are not considered natural ingredients. Ingredients may be processed or purified through certain specified techniques including at least: physical processes, fermentation, and enzymolysis. Appropriate processes and purification techniques include at least: absorption, adsorption, agglomeration, centrifugation, chopping, cooking (baking, frying, boiling, roasting), cooling, cutting, chromatography, coating, crystallization, digestion, drying (spray, freeze drying, vacuum), evaporation, distillation, electrophoresis, emulsification, encapsulation, extraction, extrusion, filtration, fermentation, grinding, infusion, maceration, microbiological (rennet, enzymes), mixing, peeling, percolation, refrigeration/freezing, squeezing, steeping, washing, heating, mixing, ion exchange, lyophilization, osmosis, precipitation, salting out, sublimation, ultrasonic treatment, concentration, flocculation, homogenization, reconstitution, enzymolysis (using enzymes found in nature). Processing aids (currently defined as substances used as manufacturing aids to enhance the appeal or utility of a food component, including clarifying agents, catalysts, flocculants, filter aids, and crystallization inhibitors, etc. See 21 CFR § 170.3(o)(24)) are considered incidental additives and may be used if removed appropriately.

Sweeteners suitable for use in various juice beverage embodiments of the beverage products disclosed here include natural sweeteners. Suitable sweeteners and combinations of sweeteners are selected for the desired nutritional characteristics, taste profile, beverage mouthfeel and other organoleptic factors. Natural sweeteners suitable for at least certain exemplary embodiments include, for example, erythritol, tagatose, sorbitol, mannitol, xylitol, maltose, rhamnose, trehalose, glycyrrhizin, malitol, lactose, Lo Han Guo ("LHG"), rebaudiosides, steviol glycosides, xylose, arabinose, isomalt, lactitol, maltitol, and ribose, and protein sweeteners such as thaumatin, monellin, brazzein, and monatin. Natural non-nutritive sweeteners suitable for some or all embodiments of the reduced calorie, light, or low-calorie juice beverages disclosed here include, for example, rebaudioside A, stevioside, other steviol glycosides, *Stevia rebaudiana* extracts, Lo Han Guo, e.g., LHG juice concentrate or LHG powder having a mogroside V content of from about 2 to about 99%, monatin, glycyrrhizin, thaumatin, monellin, brazzein, and mixtures of any of them. Also, in at least certain exemplary embodiments of the beverages disclosed here, combinations of one or more natural sweeteners are used to provide the sweetness and other aspects of desired taste profile and nutritive characteristics. It should also be recognized that certain such sweeteners will, either in addition or instead, act as tastents, masking agents or the like in various embodiments of the beverages disclosed here, e.g., when used in amounts below its (or their) sweetness perception threshold in the beverage in question.

Certain exemplary embodiments of the beverage products disclosed here include natural non-nutritive sweeteners, for example, rebaudioside A, stevioside, other steviol glycosides, *Stevia rebaudiana* extracts, Lo Han Guo (e.g., LHG juice concentrate, LHG powder, or mogroside V), thaumatin, monellin, brazzein, and monatin. LHG, if used, may have, for example, mogroside V content of from about 2 to about 99%. Optionally, the sweetener component can include erythritol, tagatose, or a mixture of the two. Non-nutritive, high potency sweeteners typically are employed at a level of milligrams per fluid ounce of beverage, according to their sweetening power, any applicable regulatory provisions of the country where the beverage is to be marketed, the desired level of sweetness of the beverage, etc. It will be within the ability of those skilled in the art, given the benefit of this disclosure, to select suitable additional or alternative sweeteners for use in various embodiments of the beverage products disclosed here.

As mentioned above, at least certain exemplary embodiments of the beverage products disclosed here employ steviol glycosides, rebaudiosides, and related compounds for sweetening. These sweeteners can be obtained, for example, by extraction or the like from the stevia plant. *Stevia* (e.g., *Stevia rebaudiana* Bertoni) is a sweet-tasting plant. Its leaves contain a complex mixture of naturally sweet diterpene glycosides. Steviol glycosides and especially rebaudiosides are components of *Stevia* that contribute sweetness. Typically, these compounds are found to include stevioside (4-13% dry weight), steviolbioside (trace), the rebaudiosides, including rebaudioside A (2-4%), rebaudioside B (trace), rebaudioside C (1-2%), rebaudioside D (trace), and rebaudioside E (trace), and dulcoside A (0.4-0.7%). The following nonsweet constituents also have been identified in the leaves of *stevia* plants: labdane, diterpene, triterpenes, sterols, flavonoids, volatile oil constituents, pigments, gums and inorganic matter. When rebaudioside A is added to juice beverages according to the present invention, no metallic aftertaste is obtained at is typical in the case of artificial sweeteners. In certain exemplary embodiments, rebaudioside A is included in the beverage product in an amount between about 0.005% by weight and about 0.10% by weight, e.g., between about 0.01% and about 0.05%.

The sweetener Lo Han Guo, which has various different spellings and pronunciations and is abbreviated here in some instances as LHG, can be obtained from fruit of the plant family Cucurbitaceae, tribe Jollifieae, subtribe Thladianthinae, genus *Siraitia*. LHG often is obtained from the genus/species *S. grosvenorii, S. siamensis, S. silomaradjae, S. sikkimensis, S. africana, S. borneensis*, and *S. taiwaniana*. Suitable fruit includes that of the genus/species *S. grosvenorii*, which is often called Luo Han Guo fruit. LHG contains triterpene glycosides or mogrosides, which constituents may be used as LHG sweeteners. Lo Han Guo is a potent sweetener which can be provided as a natural nutritive or natural non-nutritive sweetener. For example. Lo Han Guo juice concentrate may be a nutritive sweetener, and Lo Han Guo powder may be a non-nutritive sweetener. Luo Han Guo can be used as the juice or juice concentrate, powder, etc. Preferably LHG juice contains at least about 0.1%, e.g., from 0.1% to about 15%, mogrosides, preferably mogroside V, mogroside IV, 11-oxo-mogroside V, siamenoside and mixtures thereof. Mogroside V derived from LHG can be used as a natural non-nutritive sweetener. LHG can be produced, for example, as discussed in U.S. Pat. No. 5,411,755. Sweeteners from other fruits, vegetables or plants also may be used as natural or processed sweeteners or sweetness enhancers in at least certain exemplary embodiments of the beverages disclosed here.

Certain exemplary embodiments of the beverage products of the present invention comprise homogenized pulp. Surprisingly, it has been found that homogenized pulp positively affects both the sweet taste and mouthfeel of a reduced calorie, light, or low-calorie juice beverage embodiment of the present invention when used in combination with a natural non-nutritive sweetener. Advantageously, homogenized pulp enhances the mouthfeel of the beverage product by providing increased viscosity. In addition, homogenized pulp provides added fruit flavor (e.g., orange flavor from orange pulp), and added sweetness to the beverage product. In certain exemplary embodiments, homogenized pulp comprises citrus pulp, e.g., orange pulp, grapefruit pulp, lemon pulp, lime pulp, among others, and mixtures of any of them. As used herein, citrus pulp is defined as the ruptured juice sacs and segment walls recovered after the citrus juice extraction process. As used herein, homogenized pulp is defined as pulp particles suspended in aqueous solution that do not separate out of suspension. Homogenized pulp may be produced by various homogenization techniques, using equipment such as a blender or a colloid mill. In certain exemplary embodiments, the homogenized pulp has an average particle size of about 60 to about 200 microns, about 70 to about 100 microns, or about 150 to about 250 microns; wherein at least 80% of the homogenized pulp particles are between 50 and 540 microns. In certain exemplary embodiments, the beverage product includes homogenized pulp in an amount from about 5% to about 20% by weight of the beverage, e.g., about 10% to about 15% by weight.

It should be understood that beverage products in accordance with this disclosure may have any of numerous different specific formulations or constitutions. The formulation of a beverage product in accordance with this disclosure can vary to a certain extent, depending upon such factors as the beverage product's intended market segment, its desired nutritional characteristics, flavor profile and the like. For example, it will generally be an option to add further ingredients to the formulation of a particular beverage embodiment, including any of the beverage formulations described herein. The beverage product may optionally include various additional ingredients, such as other sweeteners, vitamins, minerals, flavoring agents, coloring agents, emulsifiers, thickeners, stabilizers, pH adjusters, preservatives, carbonation, and caffeine, among others. Other additives, such as those described hereinabove, are also contemplated and within the scope of the invention.

Certain exemplary embodiments of the present invention optionally comprise at least one flavoring agent. Flavoring agents include fruit flavors, botanical flavors, spice flavors, and taste modifiers, among others. Taste modifiers may provide their own characteristic flavor, or may have little or no flavor impact by themselves. Taste modifiers have any one or more of the properties of reducing, masking, or eliminating undesirable taste characteristics, or enhancing desirable taste characteristics, for example, by controlling one or more of sweetness, sourness, bitterness, saltiness, mouthfeel, or taste temporal effects. Non-limiting examples of undesirable taste characteristics reduced by taste modifiers include one or more of bitter aftertaste, metallic aftertaste, astringency, thin mouthfeel, harshness, delayed sweetness onset, lingering sweetness, excess sourness, and other off-notes. Non-limiting examples of desirable taste characteristics enhanced by taste modifiers include one or more of sweetness intensity or impact, fullness or body, and smoothness, among others. Non-limiting examples of taste modifiers include organic acids (e.g., citric acid, malic acid, ascorbic acid, tartaric acid, lactic acid, adipic acid, fumaric acid, gluconic acid, succinic acid, maleic acid, among others), propylene glycol, glycerol, ethanol, and commercially available products (e.g., Symrise™ Natural Flavor, Sweetness Enhancer Type SWL 196650, Firmenich™ Natural Flavor (Modulasense™ Type) 560249 T, and Firmenich™ Natural Flavor (Modularome™ Type) 539612 T, among others). It will be within the ability of those skilled in the art, given the benefit of this disclosure, to select suitable additional or alternative taste modifiers for use in various embodiments of the beverage products disclosed here.

In certain exemplary embodiments, a desired amount of one or more fruit flavors is provided to the beverage products described here. As used herein, the term "fruit flavor" refers to any fruit fraction, fruit component (e.g., rind, zest, pith, pericarp, pulp, flower (e.g., petals), leaf, stem, seed, and the like), from the named fruit (FTNF) flavor (e.g., a combination of fruit essence, fruit oil and/or fruit flavor, such as, e.g., an orange from the named fruit flavor), fruit extract (e.g., expressed, absorbed, macerated, distilled and the like), fruit oil (e.g., essential oil, folded essential oil), fruit essence, fruit puree, fruit aroma and the like that can be added to a food product to enhance flavor (e.g., to provide and/or enhance one or more high note flavors). In certain exemplary embodiments, one or more citrus fruit flavors are used. The citrus flavor may include one or more of an orange fraction, an orange component, an orange extract, an orange essential oil, an orange folded essential oil, an orange aroma, and an orange essence. The citrus flavor may also include one or more of a fraction, component, extract, essential oil, folded essential oil, aroma, or essence of grapefruit, lemon, lime, or tangerine, among others. The citrus flavor may also include chemical compounds extracted from natural sources or synthetically produced e.g., limonene, octanol and its derivatives, acetaldehyde, α-pinene, β-pinene, sabinene, myrcene, octanal, linalool, carene, decanal, citral, sinensal, among others. In certain exemplary embodiments, the fruit flavor is present in an amount of approximately about 0.001% to about 0.005% by weight of the beverage product, in an amount of approximately about 0.01% to about 0.05% by weight, or in an amount of approximately about 0.01% to about 0.5% by weight.

As used here, the term "botanical flavor" refers to flavors derived from parts of a plant other than the fruit. As such, botanical flavors can include those flavors derived from essential oils and extracts of nuts, bark, roots and leaves. Examples of such flavors include cola flavors, tea flavors, spice flavors and the like, and mixtures thereof. Non-limiting examples of spice flavors include cassia, clove, cinnamon, pepper, ginger, vanilla, cardamom, coriander, root beer, sassafras, ginseng, and others. Numerous additional and alternative flavoring agents suitable for use in at least certain exemplary embodiments will be apparent to those skilled in the art given the benefit of this disclosure. Flavorings can be in the form of an extract, oleoresin, juice concentrate, bottler's base, or other forms known in the art. In at least certain exemplary embodiments, such spice or other flavors compliment that of a juice or juice combination.

The one or more flavoring agents can be used in the form of an emulsion. A flavoring emulsion can be prepared by mixing some or all of the flavorings together, optionally together with other ingredients of the beverage, and an emulsifying agent. The emulsifying agent may be added with or after the flavoring agents are mixed together. In certain exemplary embodiments the emulsifying agent is water-soluble. Exemplary suitable emulsifying agents include gum acacia, modified starch, carboxymethylcellulose, gum tragacanth, gum ghatti and other suitable gums. Additional suitable emulsifying agents will be apparent to those skilled in the art of beverage formulations, given the benefit of this disclosure. The emulsifier in exemplary embodiments comprises greater than about 3% of the mixture of flavoring agents and emulsifier. In certain exemplary embodiments the emulsifier is from about 5% to about 30% of the mixture.

Organic acids used in certain exemplary embodiments of the beverage products disclosed here can serve one or more additional functions, including, for example, lending tartness to the taste of the beverage, enhancing palatability, increasing thirst quenching effect, and acting as a mild preservative. Exemplary organic acids include citric acid, malic acid, ascorbic acid, tartaric acid, lactic acid, adipic acid, fumaric acid, gluconic acid, succinic acid, and maleic acid. Other suitable acids are known and will be apparent to those skilled in the art given the benefit of this disclosure. The particular acid or acids chosen and the amount used will depend, in part, on the other ingredients, the desired shelf life of the beverage product, as well as effects on the beverage pH, titratable acidity, and taste. Those skilled in the art, given the benefit of this disclosure, will recognize that in the formation of calcium-supplemented beverages, the presence of calcium salts increases the pH, which requires additional acids to assist the dissolution of the calcium salt and maintain a desirable pH. The presence of the additional acid in the beverage composition, which increases the titratable acidity of the composition, will result in a more tart or sour taste to the resulting beverage. It will be within the ability of those skilled in the art, given the benefit of this disclosure, to select a suitable acid or combination of acids and the amounts of such acids for the acidulant component of any particular embodiment of the beverage products disclosed here. For example, certain embodiments of the beverage product may include one or more organic acids in an amount from about 0.1% to about 1.0% by weight of the beverage product, e.g., about 0.2% to about 0.7% by weight, or about 0.3% to about 0.6% by weight.

Certain exemplary embodiments of the beverages disclosed here may contain one or more added vitamins, e.g., added Vitamin A (including Vitamin A precursors such as beta carotene), Vitamin $B_1$ (i.e., thiamine), Vitamin $B_2$ (i.e., riboflavin), Vitamin $B_3$ (i.e., niacin), Vitamin $B_6$, Vitamin $B_7$ (i.e., biotin), Vitamin $B_9$ (i.e., folic acid), Vitamin $B_{12}$ (i.e., cobalamin), Vitamin C (i.e., ascorbic acid), Vitamin D, and Vitamin E (i.e., tocopherols and tocotrienols), and Vitamin K, and combinations thereof. Certain exemplary embodiments of the beverages disclosed here may contain one or more added minerals, e.g., added calcium, potassium, magnesium, phosphorous, zinc, and iron, among others. Certain exemplary embodiments of the beverages disclosed here also may contain small amounts of buffering agents to adjust pH. Such pH adjusters include, e.g., the sodium and potassium salts of citric, tartaric, and lactic acids. The amount included will depend, of course, on the type of buffering agents and on the degree to which the pH is to be adjusted.

Methods of beverage preservation suitable for at least certain exemplary embodiments of the beverage products disclosed here include, e.g., aseptic packaging and/or heat treatment or thermal processing steps, such as hot filling and tunnel pasteurization. Such steps can be used to reduce yeast, mold and microbial growth in the beverage products. For example, U.S. Pat. No. 4,830,862 to Braun et al. discloses the use of pasteurization in the production of fruit juice beverages as well as the use of suitable preservatives in carbonated beverages. U.S. Pat. No. 4,925,686 to Kastin discloses a heat-pasteurized freezable fruit juice composition which contains sodium benzoate and potassium sorbate. In general, heat treatment includes hot fill methods typically using high temperatures for a short time, e.g., about 190° F. (87.8° C.) for 10 seconds, tunnel pasteurization methods typically using lower temperatures for a longer time, e.g., about 160° F. (71.1° C.) for 10-15 minutes, and retort methods typically using, e.g., about 250° F. (121° C.) for 3-5 minutes at elevated pressure, i.e., at pressure above 1 atmosphere.

EXAMPLES

The following examples are specific embodiments of the present invention but are not intended to limit it.

Example 1

| Ingredients | Sample 1A % by Weight | Sample 1B % by Weight | Sample 1C % by Weight | Sample 1D % by Weight |
| --- | --- | --- | --- | --- |
| Orange juice | 22.240 | 22.240 | 22.240 | 22.240 |
| Filtered water | 65.628 | 61.584 | 57.540 | 53.496 |
| Homogenized pulp | 7.692 | 10.256 | 12.820 | 15.384 |
| Pasteurized orange pulp | 3.696 | 4.928 | 6.160 | 7.392 |
| Rebaudioside A | 0.012 | 0.016 | 0.020 | 0.024 |
| Symrise number 196650 | 0.060 | 0.080 | 0.100 | 0.120 |
| Malic acid | 0.108 | 0.144 | 0.180 | 0.216 |
| Citric acid | 0.108 | 0.144 | 0.180 | 0.216 |
| Potassium citrate | 0.126 | 0.168 | 0.210 | 0.252 |
| Citrus flavor | 0.018 | 0.024 | 0.030 | 0.036 |
| Orange oil/tocopherol mixture | 0.018 | 0.024 | 0.030 | 0.036 |
| Beta carotene | 0.012 | 0.016 | 0.020 | 0.024 |
| Vitamin mixture | 0.048 | 0.064 | 0.080 | 0.096 |
| Modified food starch | 0.234 | 0.312 | 0.390 | 0.468 |
|  | 100.000 | 100.000 | 100.000 | 100.000 |

Four samples of naturally sweetened light orange juice beverages according to this disclosure were prepared by thoroughly mixing the ingredients in each of the above columns. The orange juice beverage samples made according to this example were compared by a descriptive panel of taste testers to an analogous light orange juice beverage formulation artificially sweetened with sucralose and acesulfame K. The descriptive panel measured the intensity of certain taste and mouthfeel attributes in each orange juice sample, and subsequent analysis of the descriptive panel data indicated that at least one of the naturally sweetened orange juice beverage samples according to this example was on parity with, if not more palatable than, the analogous artificially sweetened orange juice beverage formulation.

Example 2

| Ingredients | Sample 2A % by Weight | Sample 2B % by Weight | Sample 2C % by Weight | Sample 2D % by Weight |
| --- | --- | --- | --- | --- |
| Orange juice | 28.830 | 28.830 | 28.830 | 28.830 |
| Filtered water | 62.614 | 59.762 | 56.910 | 54.058 |
| Homogenized pulp | 7.692 | 10.256 | 12.820 | 15.384 |
| Rebaudioside A | 0.012 | 0.016 | 0.020 | 0.024 |
| Symrise number 196650 | 0.060 | 0.080 | 0.100 | 0.120 |
| Malic acid | 0.204 | 0.272 | 0.340 | 0.408 |
| Citric acid | 0.204 | 0.272 | 0.340 | 0.408 |
| Potassium citrate | 0.186 | 0.248 | 0.310 | 0.372 |
| Calcium hydroxide | 0.102 | 0.136 | 0.170 | 0.204 |
| Citrus flavor | 0.018 | 0.024 | 0.030 | 0.036 |
| Orange oil/tocopherol mixture | 0.018 | 0.024 | 0.030 | 0.036 |
| Beta carotene | 0.012 | 0.016 | 0.020 | 0.024 |
| Vitamin mixture | 0.048 | 0.064 | 0.080 | 0.096 |
|  | 100.000 | 100.000 | 100.000 | 100.000 |

Four samples of calcium-supplemented, naturally sweetened, light orange juice beverages according to this disclosure were prepared by thoroughly mixing the ingredients in each of the above columns. The orange juice beverage samples made according to this example were compared by a descriptive panel of taste testers to an analogous light orange juice beverage formulation artificially sweetened with sucralose and acesulfame K. The descriptive panel measured the intensity of certain taste and mouthfeel attributes in each orange juice formulation, and subsequent analysis of the descriptive panel data indicated that at least one of the naturally sweetened orange juice beverage samples according to this example was on parity with, if not more palatable than, the analogous artificially sweetened orange juice beverage formulation.

Example 3

| Ingredients | Sample 3A % by Weight | Sample 3B % by Weight | Sample 3C % by Weight | Sample 3D % by Weight |
|---|---|---|---|---|
| Orange juice | 28.8310 | 28.8310 | 28.8310 | 28.8310 |
| Filtered water | 62.6496 | 59.8098 | 56.9700 | 54.1302 |
| Homogenized pulp | 7.6920 | 10.2560 | 12.8200 | 15.3840 |
| Rebaudioside A | 0.0120 | 0.0160 | 0.0200 | 0.0240 |
| Firmenich number 560249 T | 0.0360 | 0.0480 | 0.0600 | 0.0720 |
| Firmenich number 539612 T | 0.0180 | 0.0240 | 0.0300 | 0.0360 |
| Malic acid | 0.2040 | 0.2720 | 0.3400 | 0.4080 |
| Citric acid | 0.2040 | 0.2720 | 0.3400 | 0.4080 |
| Potassium citrate | 0.1860 | 0.2480 | 0.3100 | 0.3720 |
| Calcium hydroxide | 0.1020 | 0.1360 | 0.1700 | 0.2040 |
| Citrus flavor | 0.0054 | 0.0072 | 0.0090 | 0.0108 |
| Beta carotene | 0.0120 | 0.0160 | 0.0200 | 0.0240 |
| Vitamin mixture | 0.0480 | 0.0640 | 0.0800 | 0.0960 |
|  | 100.0000 | 100.0000 | 100.0000 | 100.0000 |

Four samples of calcium-supplemented, naturally sweetened, light orange juice beverages according to this disclosure were prepared by thoroughly mixing the ingredients in each of the above columns. The orange juice beverage samples made according to this example were compared by a descriptive panel of taste testers to an analogous light orange juice beverage formulation artificially sweetened with sucralose and acesulfame K. The descriptive panel measured the intensity of certain taste and mouthfeel attributes in each orange juice formulation, and subsequent analysis of the descriptive panel data indicated that at least one of the naturally sweetened orange juice beverage samples according to this example was on parity with, if not more palatable than, the analogous artificially sweetened orange juice beverage formulation.

Given the benefit of the above disclosure and description of exemplary embodiments, it will be apparent to those skilled in the art that numerous alternative and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed is:

1. A ready to drink beverage product comprising:
    at least one from-concentrate orange fruit juice present in an amount of 10% to 75% by weight of the ready to drink beverage product;
    added water;
    at least one natural non-nutritive sweetener present in an amount between about 0.01% and 0.05% by weight of the beverage, wherein the at least one natural non-nutritive sweetener consists essentially of rebaudioside A, stevioside and steviol glycoside, and
    no artificial sweeteners; and
    exogenous added homogenized pulp having an average particle size of about 60 to about 200 microns and present in an amount of about 10% to about 15% by weight of the beverage;
    wherein the beverage product is a light beverage comprising at least ⅓ less calories per 8 oz. serving as compared to an 8 oz. serving of the from-concentrate fruit juice; and
    wherein the exogenous homogenized pulp enhances the mouthfeel of the beverage product by providing increased viscosity.

2. The beverage product of claim 1, wherein the from-concentrate orange fruit juice comprises 15% to 50% by weight of the beverage product.

3. The beverage product of claim 1, wherein the added water is present in an amount from 40% to 70% by weight of the beverage product.

4. The beverage product of claim 1, wherein the exogenous added homogenized pulp comprises orange pulp.

5. The beverage product of claim 1, further comprising a taste modifier.

6. The beverage product of claim 1, further comprising at least one of an organic acid, a fruit flavor, a vitamin, a mineral, a buffering agent, a colorant, or a preservative.

7. The beverage product of claim 6, wherein the organic acid is selected from the group consisting of citric acid, malic acid, ascorbic acid, tartaric acid, lactic acid, and mixtures of any of them.

8. The beverage product of claim 7, wherein the organic acid is present in an amount from 0.1% to 1.0% by weight of the beverage product.

9. The beverage product of claim 6, wherein the mineral is added calcium.

10. The beverage product of claim 1, further comprising a vegetable component.

11. A ready to drink beverage product comprising:
    from-concentrate orange juice in an amount of 10% to 75% by weight of the ready to drink beverage product;
    added water;
    a natural non-nutritive sweetener present in an amount between about 0.01% and
    0.05% by weight of the beverage and no artificial sweetener, wherein the at least one natural non-nutritive sweetener consists essentially of rebaudioside A, stevioside and steviol glycoside;
    exogenous added homogenized orange pulp having an average particle size of about 60 to about 200 microns and present in about 10% to about 15% by weight of the beverage;
    at least one citrus flavor;
    citric acid and malic acid; and
    wherein the beverage product is a light beverage comprising at least ⅓ less calories per 8 oz. serving as compared to an 8 oz. serving of the from-concentrate orange juice.

12. The beverage product of claim 11, wherein the beverage product is more palatable than the analogous beverage product instead sweetened with artificial sweeteners.

13. The beverage product of claim 11, wherein the beverage product is more palatable than the analogous beverage product instead sweetened to the same level of sweetness with sucralose and acesulfame potassium.

14. The beverage product of claim 11, further comprising at least one thickener.

15. The beverage product of claim 11, further comprising modified food starch.

16. The beverage product of claim 11, wherein the beverage product comprises about 50 calories per 8 oz. serving.

17. The beverage product of claim 11, wherein the added water is present in an amount from 15% to 80% by weight of the beverage product.

* * * * *